US010593982B2

(12) United States Patent
Yeon et al.

(10) Patent No.: US 10,593,982 B2
(45) Date of Patent: Mar. 17, 2020

(54) FLOW TYPE ENERGY STORAGE DEVICE AND REACTION CELL FOR THE DEVICE

(71) Applicant: KOREA INSTITUTE OF ENERGY RESEARCH, Daejeon (KR)

(72) Inventors: Sun-Hwa Yeon, Sejong-si (KR); Kyoung-Hee Shin, Daejeon (KR); Jae-Deok Jeon, Daejeon (KR); Jung Joon Yoo, Daejeon (KR); Hana Yoon, Daejeon (KR); Chang-Soo Jin, Daejeon (KR); Joon-Mok Shim, Sejong-si (KR); Jung-Hoon Yang, Daejeon (KR); Kyu-Nam Jung, Daejeon (KR); Dong-Ha Kim, Daejeon (KR); Se-Kook Park, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 331 days.

(21) Appl. No.: 15/099,742

(22) Filed: Apr. 15, 2016

(65) Prior Publication Data

US 2016/0308236 A1 Oct. 20, 2016

(30) Foreign Application Priority Data

Apr. 17, 2015 (KR) ........................ 10-2015-0054409

(51) Int. Cl.
*H01M 8/18* (2006.01)
*H01M 8/04082* (2016.01)
(Continued)

(52) U.S. Cl.
CPC ............ *H01M 8/188* (2013.01); *H01G 11/02* (2013.01); *H01G 11/08* (2013.01); *H01G 11/14* (2013.01);
(Continued)

(58) Field of Classification Search
CPC combination set(s) only.
See application file for complete search history.

(56) References Cited

U.S. PATENT DOCUMENTS 5,288,562 A 2/1994 Taniguchi et al.
9,761,379 B2 * 9/2017 Yeon ...................... H01G 11/28
(Continued)

FOREIGN PATENT DOCUMENTS

JP 10308233 A 11/1998
JP H10-308233 * 11/1998 .............. H01M 8/18
(Continued)

OTHER PUBLICATIONS

Hwang et al. KR 20140095283 ESPACENET eng mach trans with ESPACENET Abstract (Note: Hwang et al .KR 20140095283 already of record per IDS of May 17, 2017) ESPACENET Date Aug. 1, 2014.*

*Primary Examiner* — Jonathan G Leong
*Assistant Examiner* — Aaron J Greso
(74) *Attorney, Agent, or Firm* — Sughrue Mion, PLLC

(57) ABSTRACT

Disclosed is a flow-type energy storage device having an improved flow of fluid. The flow-type energy storage device stores electricity using a fluidic material, and includes a reaction region in which charge-discharge reaction of electricity is performed by the fluidic material, wherein the reaction region has an octagonal cross-section. The shape of the reaction region is controlled to thus improve the flowability of the fluidic material, thereby providing a flow-type energy storage device that has almost constant electrical properties even when a charging and discharging cycle is repeatedly performed. Further, the structures of an inlet and an outlet are not complicated and a separate part for controlling the flow of fluid is not used in the device, and (Continued)

accordingly, additional costs are not incurred during a process of manufacturing the flow-type energy storage device.

14 Claims, 9 Drawing Sheets

(51) Int. Cl.
*H01G 11/54* (2013.01)
*H01G 11/74* (2013.01)
*H01G 11/02* (2013.01)
*H01G 11/08* (2013.01)
*H01G 11/14* (2013.01)
*H01G 11/22* (2013.01)

(52) U.S. Cl.
CPC ............ *H01G 11/22* (2013.01); *H01G 11/54* (2013.01); *H01G 11/74* (2013.01); *H01M 8/04082* (2013.01); *H01M 8/04201* (2013.01); *Y02E 60/528* (2013.01); *Y02P 70/56* (2015.11)

(56) References Cited

U.S. PATENT DOCUMENTS

| | | | | |
|---|---|---|---|---|
| 9,761,397 | B1* | 9/2017 | Weber | ................... H01H 50/02 |
| 2010/0086829 | A1* | 4/2010 | Ridley | ............... H01M 8/0273 |
| | | | | 429/498 |
| 2011/0223450 | A1* | 9/2011 | Horne | ................. B60L 11/1824 |
| | | | | 429/72 |
| 2014/0050947 | A1* | 2/2014 | Donnelly | ............... H01G 11/04 |
| | | | | 429/7 |

FOREIGN PATENT DOCUMENTS

| | | | | |
|---|---|---|---|---|
| JP | 2011-222312 | * | 11/2011 | ............. H01M 8/18 |
| KR | 10-2001-0040373 | A | 5/2001 | |
| KR | 10-1176559 | B1 | 8/2012 | |
| KR | 1020140095283 | A | 1/2014 | |
| KR | 10-2014-0095283 | A | 8/2014 | |
| KR | 10-2015-0007750 | A | 1/2015 | |

* cited by examiner

FLOW TYPE ENERGY STORAGE DEVICE AND REACTION CELL FOR THE DEVICE

CROSS-REFERENCE TO RELATED APPLICATION

This application claims the benefit of Korean Patent Application No. 10-2015-0054409, filed on Apr. 17, 2015 in the Korean Intellectual Property Office, the disclosures of which are incorporated herein by reference.

BACKGROUND OF THE INVENTION

1. Field of the Invention

The present invention relates to a flow-type storage device and a reaction cell for use in the same, and more particularly to a flow-type energy storage device having improved flowability of fluid, and a reaction cell for use in the same.

2. Description of the Related Art

Production costs of electric power have increased due to rapid changes in the prices of fossil fuels such as petroleum and coal, which are main raw materials used to produce electric power, unstable energy supply and demand attributable to rising exchange rates, and entry into the age of high oil prices and compulsory reduction of greenhouse gas emissions. Accordingly, national energy management, systems are required. Greenhouse gases, which are emitted from known energy sources using fossil fuel, serve as a main factor in the destruction of ecosystems and environmental pollution, and accordingly, new renewable energy, such as wind power, sunlight, and tidal power, has come into the spotlight as an alternative energy source for overcoming the destruction of ecosystems and environmental pollution. However, since electric power, which is produced using new renewable energy, is very vulnerable to changes in the weather, it is impossible to uniformly and constantly supply electric power. Therefore, there is a drawback in that new renewable energy sources are not capable of being directly connected to a known electrical grid system for use. In order to overcome this drawback, large and medium-sized energy storage devices are required. Large and medium-sized secondary batteries are also required in various other fields, such as green car and green home fields, in addition to the new renewable energy storage field.

A typical secondary battery includes an electrode active material and an electrolytic solution in a fixed amount, and accordingly, there is a limitation as to the extent to which energy storage capacity can be increased. In contrast, a currently developed flow-type energy storage device, which includes a fluidic material (an electroactive compound or a slurry electrode) storing energy, such as a redox flow battery (RFB) and an electrochemical flow capacitor (EFC), has a merit in that an energy storage amount may be significantly increased depending on the size of an external tank for storing the fluidic material.

In the redox flow battery and the electrochemical flow capacitor, a redox reaction or an electric double-layer forming process is performed in a reaction region containing the fluidic material in order to store electric energy. The reaction region is formed using a gasket, and is divided by a membrane which is positioned at an intermediate position thereof. The fluidic material stays in the reaction region to come into contact with a metal or graphite current collector or the wide surface of an electrode.

However, a current redox flow battery or electrochemical flow capacitor includes a gasket having a through hole having a tetragonal cross-section, and the contact surface of the electrode or the current collector with the fluidic material is tetragonal. The known reaction region having the aforementioned structure has a problem in that the slurry-type fluidic material including the electrolyte limitedly flows with regard to the electrode.

Technology for forming a plurality of inlets, through which a slurry-type fluidic material is injected into a reaction region, and widely dispersing the inlets, or technology for further providing a separate part to control the flow of a slurry fluidic material in a reaction region, has been developed in order to overcome the aforementioned problem. However, the technologies have drawbacks in that it is difficult to manufacture devices and in that the structures of the devices are complicated.

[Prior Art Document] 1. Korean Patent No. 10-1176559, and Korean Patent Application Laid-Open Nos. 10-2014-0095283 and 10-2015-0007750

SUMMARY OF THE INVENTION

Accordingly, the present invention has been made keeping in mind the above problems occurring in the related art, and an object of the present invention is to provide a flow-type energy storage device, which has improved flowability of fluid to thus maintain electrical properties even when charging and discharging are repeatedly performed, and a reaction cell for use in the same.

In order to accomplish the above object, the present invention provides a flow-type energy storage device for storing electricity using a highly viscous slurry-type fluidic material. The flow-type energy storage device includes a reaction region in which charge-discharge reaction of electricity is performed by the fluidic material, wherein the reaction region has an octagonal cross-section.

The term "flow-type energy storage device" used in the present specification includes all devices for storing electrical energy in the fluidic: material, such as a redox flow battery and an electrochemical flow capacitor.

In the present invention, a separate flow-control part is not used, and a plurality of inlets and outlets are not formed, but the cross-section of the reaction region, in which fluid remains, is changed to be octagonal in order to improve the flowability of the fluidic material used in the flow-type energy storage device. When a highly viscous slurry-type fluidic material is used, each corner of the tetragonal cell is sharp-angled having a small angle, thereby acting as a resistor of a slurry fluidic electrode to thus hinder the smooth movement of the fluidic material, thereby precipitating the electrode. Accordingly, the octagonal cross-section may be a design which minimizes resistance during fluidization.

It is preferable that an inlet, through which the fluidic material is injected into the reaction region, and an outlet, through which the fluidic material is emitted from the reaction region, be formed, and that the inlet and the outlet be disposed so that the fluidic material flows diagonally. Specifically, the inlet and the outlet are disposed left and right at upper and lower portions so that the fluidic material flows diagonally (in any one direction of ↘ ↙ ↗ and ↖. With respect to the disposal, the inlet and the outlet may be formed at sides corresponding in position to corners of the reaction region having the tetragonal cross-section, which are removed in order to form the octagonal cross-section. When the fluidic material flows diagonally, the fluidic material more smoothly flows.

Further, it is preferable that the reaction region include an anode reaction region and a cathode reaction region, with a membrane positioned between the anode reaction region and the cathode reaction region, and that the inlet and the outlet be disposed in the anode reaction region and the cathode reaction region, respectively, so that diagonal flow directions of the fluidic material cross each other in the anode reaction region and the cathode reaction region. For example, the inlet and the outlet are disposed in each region so that the flow direction is ↗ or ↙ in the cathode reaction region when the flow direction is ↘ in the anode reaction region and the flow direction is ↘ or ↖ in the cathode reaction region when the flow direction is ↗ in the anode reaction region.

Moreover, it is preferable that the inlet and the outlet be disposed so that the fluidic material flows upward in any one reaction region of the anode reaction region and the cathode reaction region and flows downward in a remaining reaction region. For example, the inlet and the outlet are disposed so that the flow direction is ↗ in the cathode reaction region when the flow direction is ↘ in the anode reaction region, the flow direction is ↖ in the cathode reaction region when the flow direction is ↗ in the anode reaction region, and the flow direction is ↗ or ↖ in the cathode reaction region when the flow direction is ↖ or ↙ in the anode reaction region. When the flow directions horizontally and vertically cross each other in the anode and cathode reaction regions, forces attributable to the flow of fluid, which are applied to the reaction cell, are offset, improving the balance and the stability of the reaction cell. Therefore, when a stack structure, which includes a plurality of stacked reaction cells, is formed, leaning of the stack structure attributable to the flow of fluid may be prevented.

In order to accomplish the above object, the present invention also provides a reaction cell for use in a flow-type energy storage device, the reaction cell including a reaction region in which charge-discharge reaction of electricity is performed by the fluidic material, wherein the reaction region has an octagonal cross-section.

The reaction region may be formed using a gasket, and a through hole, which is formed through the gasket, may have an octagonal cross-section to thus ensure the octagonal cross-section of the reaction region.

In addition, as described above, the inlet, through which the fluidic material is injected into the reaction region, and the outlet, through which the fluidic material is emitted from the reaction region, may be disposed so that the fluidic material flows diagonally. Particularly, it is preferable that the flow directions of the fluidic material cross each other in the anode reaction region and in the cathode reaction region. Particularly, the inlet and the outlet are constituted so that the four flow directions, which include upper, lower, left, and right directions, cross each other to thus offset forces attributable to the flow of fluid, which are applied to the reaction cell, thereby improving the balance and the stability of the reaction cell.

In the present invention having the aforementioned constitution, the shape of the reaction region is controlled to thus improve the flowability of the fluidic material, thereby providing a flow-type energy storage device which has almost constant electrical properties even when a charging and discharging cycle is repeatedly performed.

Further, in the present invention, the structures of the inlet and the outlet are not complicated and a separate part for controlling a flow of fluid is not used in the device, and accordingly, additional costs are not incurred during a process of manufacturing the flow-type energy storage device.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

A detailed description, will be given, of embodiments of the present invention, with reference to the appended drawings.

Figure 1:
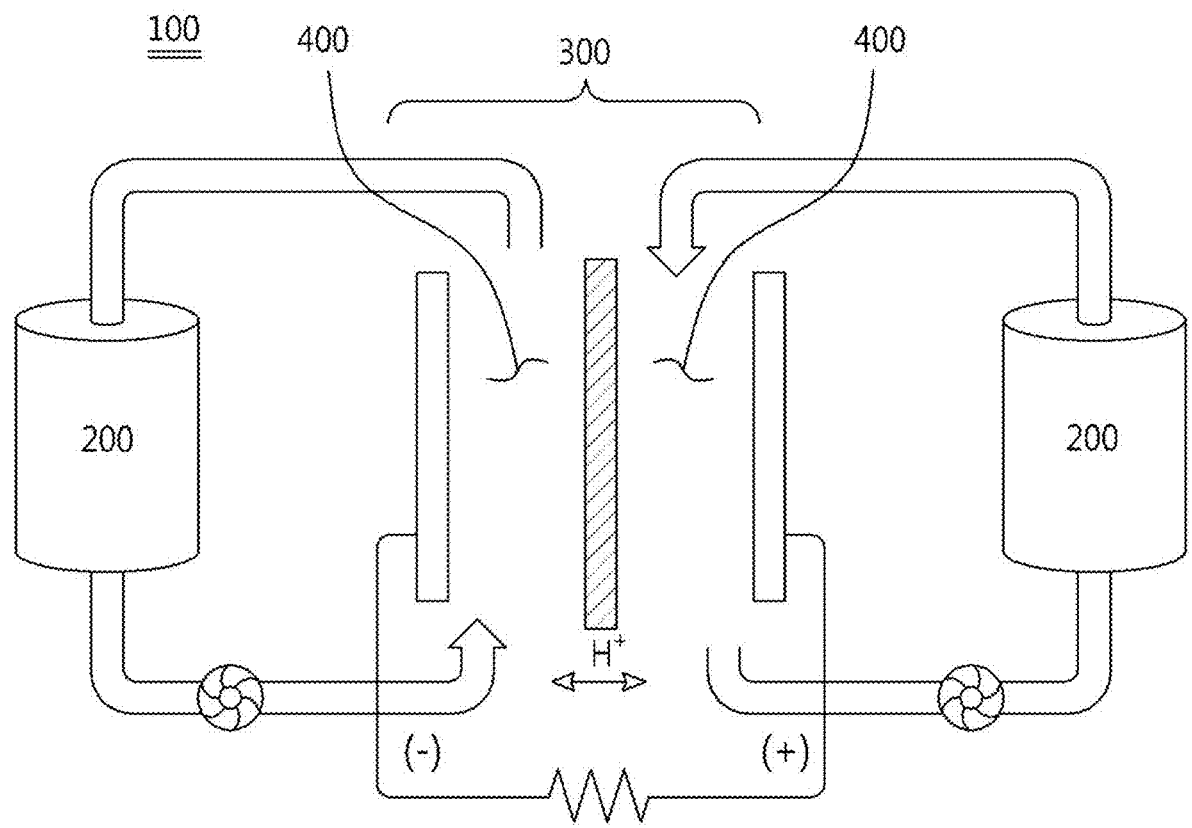
FIG. 1 is a mimetic diagram showing the constitution of a flow-type energy storage device.

FIG. 1 is a mimetic diagram showing the constitution of a flow-type energy storage device.

A flow-type energy storage device 100 typically includes a storage tank 200, storing a fluidic material, and a reaction cell 300, including reaction regions 400 in which an electrical charging or discharging reaction of the fluidic material is performed. A known technology may be applied without any modification to the constitution of circulation of the fluidic material and the constitution of electrical connection to the outside with respect to the reaction, and accordingly, a detailed description thereof will be omitted.

Figure 2:
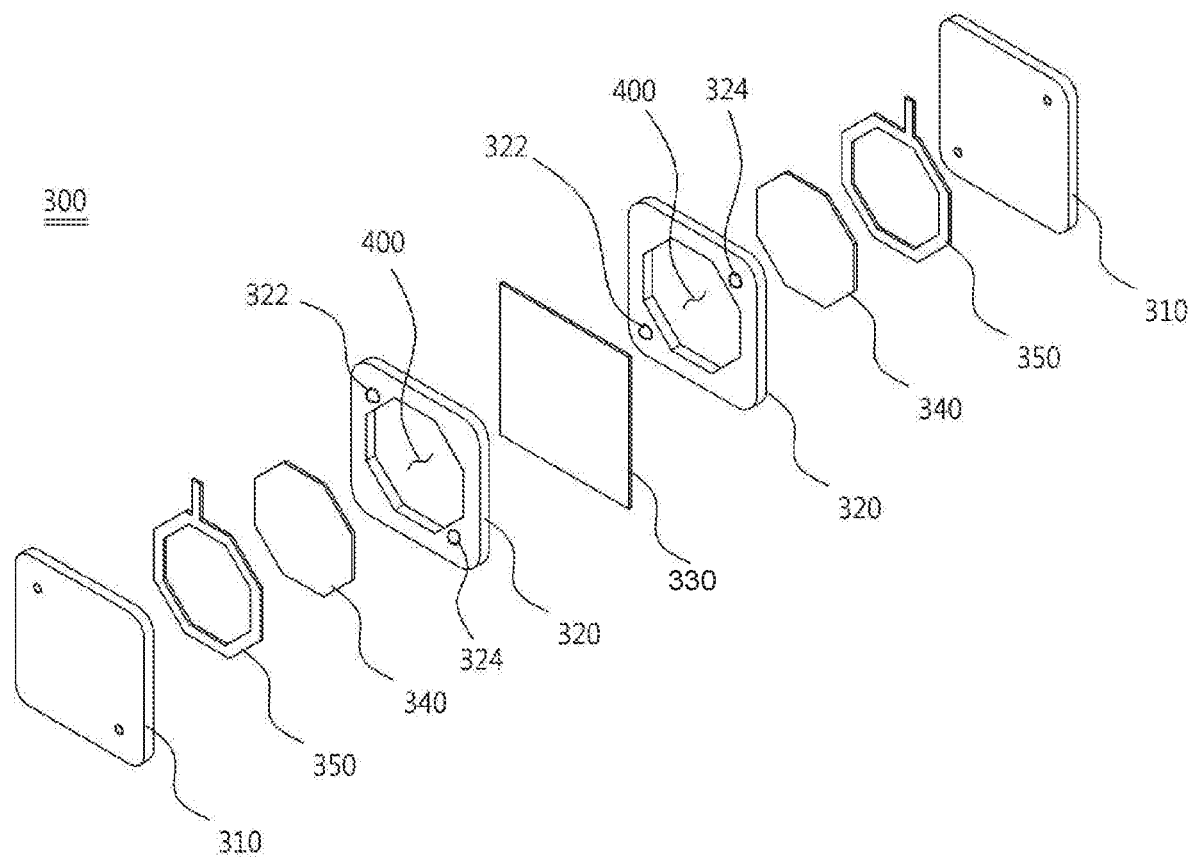
FIG. 2 is an exploded perspective view showing the structure of a reaction cell according to an Example of the present invention.

FIG. 2 is an exploded perspective view showing the structure of a reaction cell according to an Example of the present invention.

The reaction cell 300 of the present Example includes end plates 310, gas 320, and a membrane 330, and electric conductor plates 340 are provided on inner sides of the end plates 310.

Specifically, the reaction cell 300, the gaskets 320 and the end plates 310 are sequentially disposed on both sides of the membrane 330. A through hole, which is formed through the gasket 320, forms the reaction region 400, in which the fluidic material, which stores or emits electricity, is contained. The electric conductor plate 340, which is provided on the end plate 310, constitutes one lateral surface of the reaction region 400, and accordingly, the fluidic material comes into contact with the electric conductor plate 340 to perform electrical charging and discharging.

In the reaction cell 300 of the present Example, the reaction region 400, which is formed using the gasket 320, has an octagonal cross-section. Specifically, the octagonal cross-section has a truncated form obtained by removing four corners from the tetragonal cross-section of the reaction region of a known gasket. Due to the aforementioned structure, the fluidic material flows smoothly compared to the known reaction region having a tetragonal cross-section. Accordingly, a contact property between the fluidic material and the electric conductor plate 340 is improved to thus improve the performance of the flow-type energy storage device.

In the present Example, in addition to the through hole in the gasket 320, the electric conductor plate 340 is formed in an octagonal shape in order to reduce material costs. However, as long as the electric conductor plate 340 has a size large enough to completely cover one side of the gasket. 320, the electric conductor plate 340 may have other shapes, and the known tetragonal electric conductor plate 340 may be used.

Further, the electric conductor plate 340, which serves as the electrode at a redox flow battery or the current collector of an electrochemical flow capacitor, typically includes a graphite material. In the present Example, a current collecting plate 350 including a metal material, which is charged with electricity or from which electricity is discharged to the outside, is further provided, in addition to the electric conductor plate 340 including the graphite material.

In addition, in order to improve the flowability of the fluidic material, an inlet 322 and an outlet 324 are positioned so that the fluidic material flows diagonally in the reaction region 400. Specifically, the inlet 322 and the outlet 324 are formed at sides corresponding in position to corners, which are diagonal to each other, such as upper left and lower right corners or upper right and lower left corners, of the known reaction region having the tetragonal cross-section. Further, the inlet 322 and the outlet 324 are disposed at the upper left and lower right sides, respectively, in one reaction region, and at the lower left and upper right sides, respectively, in the other reaction region so that the flow directions of the fluidic material cross each other in the cathode and anode reaction regions. Due to the aforementioned structure, the fluidic material flows in through the upper left side and flows out through the lower right side in one reaction region, and flows in through the lower left side and flows out through the upper right side in the other reaction region if the flow directions of the fluidic material, which flows diagonally in the two reaction regions divided by the membrane 330, are inverse with respect to the upper, lower, left, and right sides, the upper, lower, left, and right positions are not limited to the aforementioned structure, but may be changed.

Accordingly, when the diagonal flow directions of the fluidic material, which flows into the two reaction regions facing each other, are opposite each other and cross each other, forces attributable to the flow of fluid, which are applied to the reaction cell, may be offset to thus improve the balance and the stability of the reaction cell. The balance and the stability of the reaction cell are particularly important when a stack structure is formed. A single reaction cell is described in the present Example. However, a stack structure, which includes a plurality of stacked reaction cells, is generally used in practice, but has a problem in that the stack structure leans due to the flow of the fluidic material flowing through the plurality of reaction cells. The flow directions of the fluid, which flows through the two reaction regions constituting the reaction cell, are set to cross each other to thus prevent the occurrence of problems attributable to the flow of fluid even in a structure which includes many stacked reaction cells.

Particularly, the inlet 322 and the outlet 324 may be disposed at sides, which are obtained by removing the corners of the reaction region having the tetragonal cross-section of the known gasket, to thus make better use of space, and this disposal of the inlet and the outlet may be applied to replace the reaction cell of the redox flow battery or the electrochemical flow capacitor, which includes the known reaction region having the tetragonal cross-section.

Since known technological matters may be applied to the membrane 330 of the present Example, a detailed description thereof will be omitted.

Hereinafter, the electrical properties of the electrochemical flow capacitor, which includes the reaction cell according to the present Example, and the known electrochemical flow capacitor, which includes the reaction cell including the reaction region having the tetragonal cross-section, will be compared.

Figure 3:
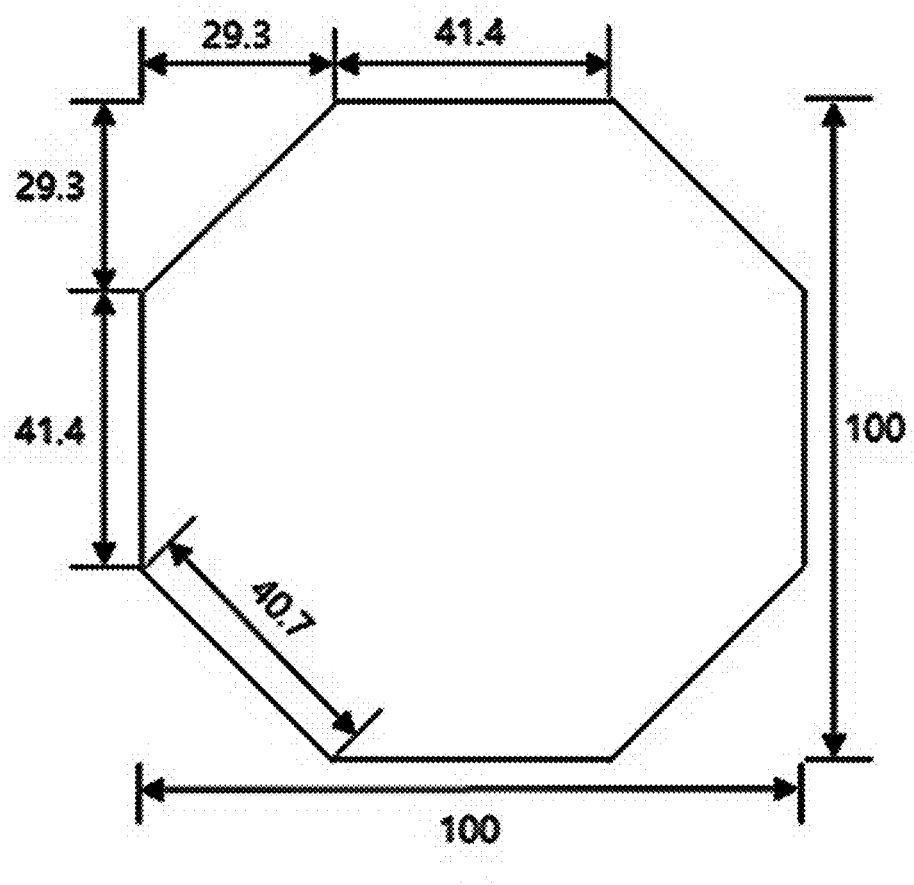
FIG. 3 is a view showing the cross-sectional shape of a reaction region according to the present Example.

FIG. 3 is a view showing the cross-sectional shape of the reaction region according to the present Example.

The reaction region of the reaction cell according to the present Example is 10 cm in height and width. However, the cross-section of the reaction region of the present Example has a truncated form obtained by removing four corners from die tetragonal cross-section of the known reaction region. Each corner of the tetragon is removed so that the removed portion forms a right-angled triangle having a bottom side of 29.3 mm and a height of 29.3 mm, our sides, which include horizontal and vertical sides, of the octagon are each 41.4 mm in length, and sides, which diagonally face each other, are each 40.7 mm in length.

In the present Example, the area of the graphite current collector, which is exposed to the reaction region, is 78 cm$^2$, the thickness of the gasket is 1 mm, and the volume of the reaction region is 7.8 cm$^3$.

In the Comparative Example, the reaction region having the tetragonal cross-section, which is 5 cm in length and breadth, is provided, the area of the graphite current collector, which is exposed to the reaction region, is 25 cm$^2$, the thickness of the gasket is 1 mm, and the total volume of the reaction region is 2.5 cm$^3$.

In addition, the inlet and the outlet of the reaction region are positioned so that diagonal flow directions cross each other, as described above, in the present Example, and the inlet and the outlet are formed at centers of top and bottom sides of the tetragon in the Comparative Example.

In addition, MSP-20 and super-P, which were activated carbon, were mixed at a mass ratio of 7:3 for use as an electrode material of a slurry electrode, which is the fluidic material for storing electricity in the electrochemical flow capacitor. The electrode material and an electrolytic solution were mixed at a mass ratio of 1:9 to manufacture the slurry electrode.

The flow rate of the slurry electrode was set to 300 ml to perform a charging and discharging experiment with a current density of 10 mA/cm$^2$.

Figure 4:
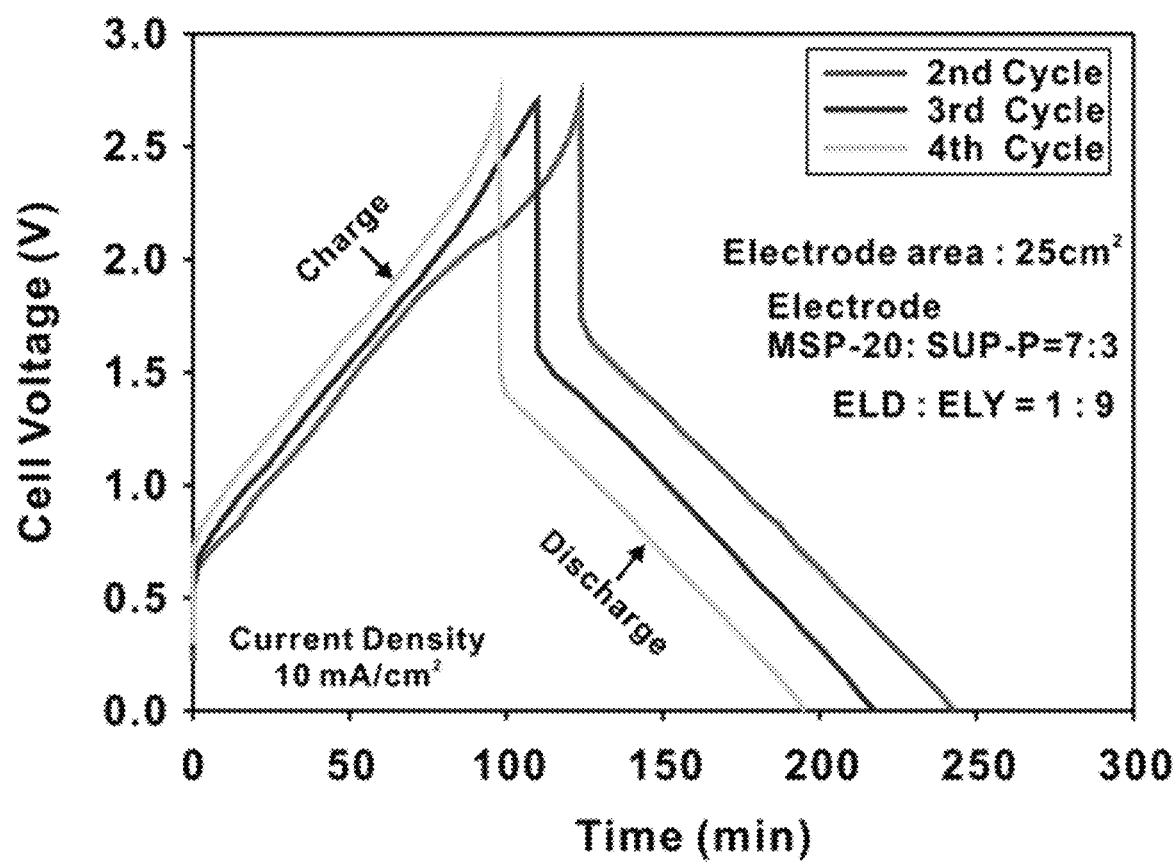
FIG. 4 is a graph showing the result of a charging and discharging experiment using a reaction cell of a Comparative Example.
Figure 5:
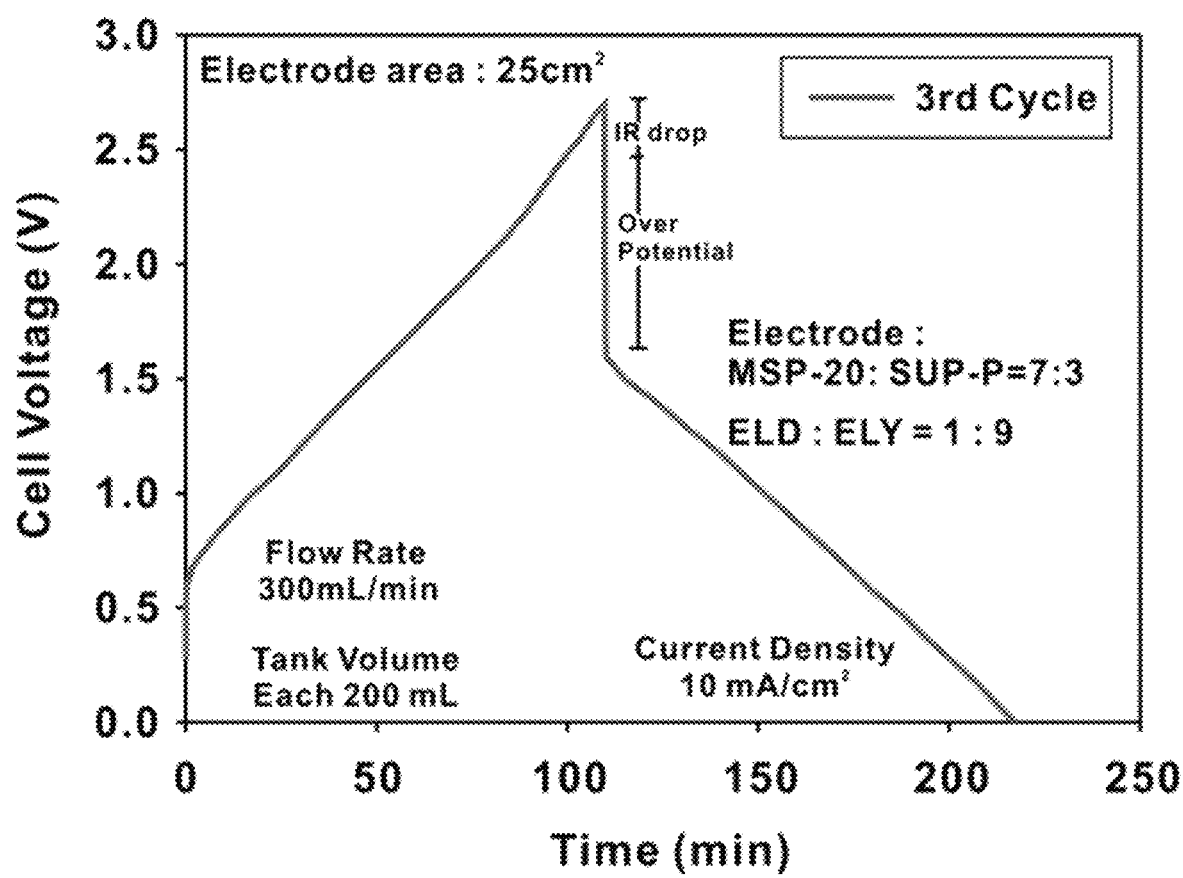
FIG. 5 is a graph separately showing the experimental result of the third cycle of FIG. 4.
Figure 6:
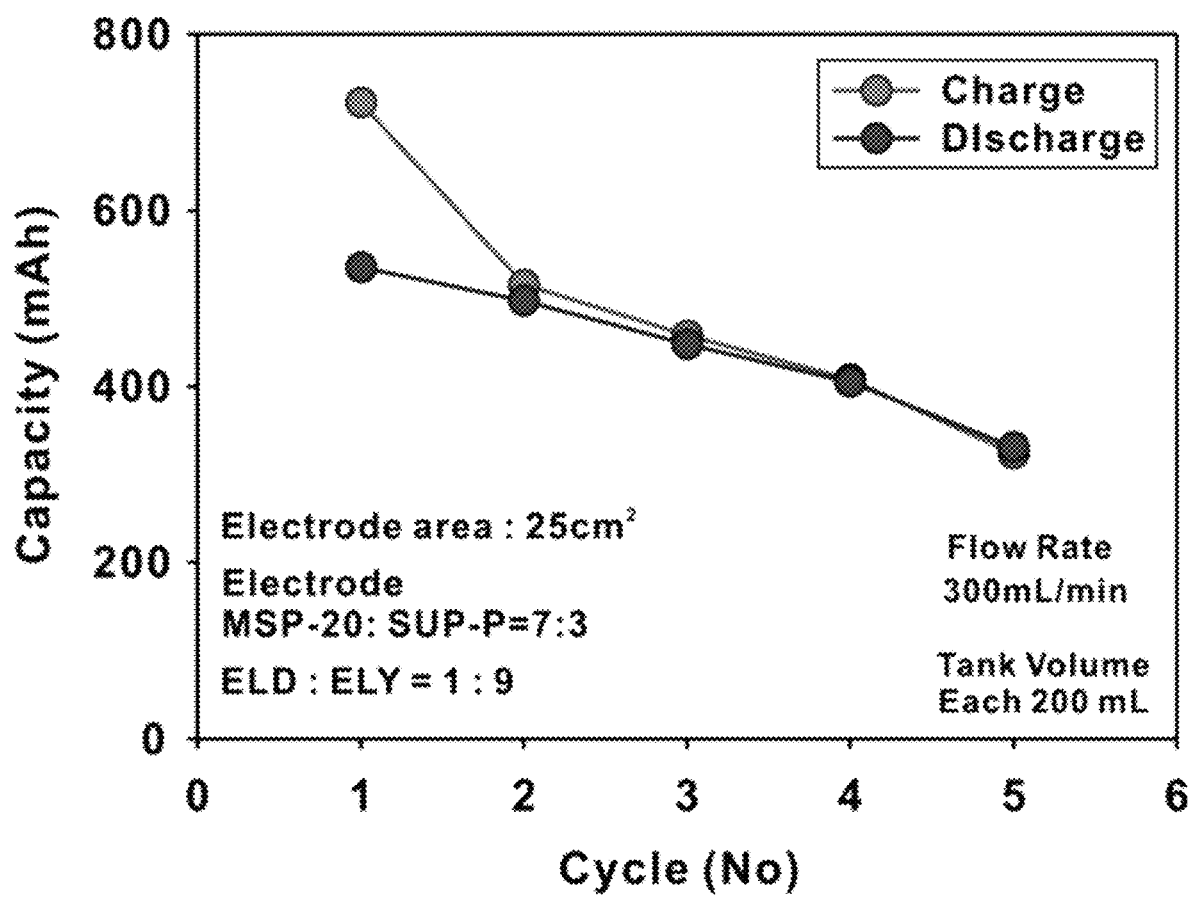
FIG. 6 is a graph showing the change in capacity of the reaction cell of the Comparative Example as a function of a charging and discharging cycle.

FIG. 4 is a graph showing the result of a charging and discharging experiment using the reaction cell of the Comparative Example, and FIG. 5 is a graph separately showing the experimental result of the third cycle. FIG. 6 is a graph showing the change in capacity of the reaction cell of the Comparative Example as a function of a charging and discharging cycle.

From FIGS. 4 and 6, it can be confirmed that the life of a single cycle is shortened and the capacity is reduced as the charging and discharging cycle is repeated. Further, it can be confirmed that the IR drop and the over-potential shown in FIG. 5 are increased as the charging and discharging cycle is repeated, as in FIG. 4. The aforementioned result is considered to be attributable to the fact that the slurry electrode, which flows into the reaction cell of the Comparative Example, is not totally flows out, but partially remains in the reaction region.

Figure 7:
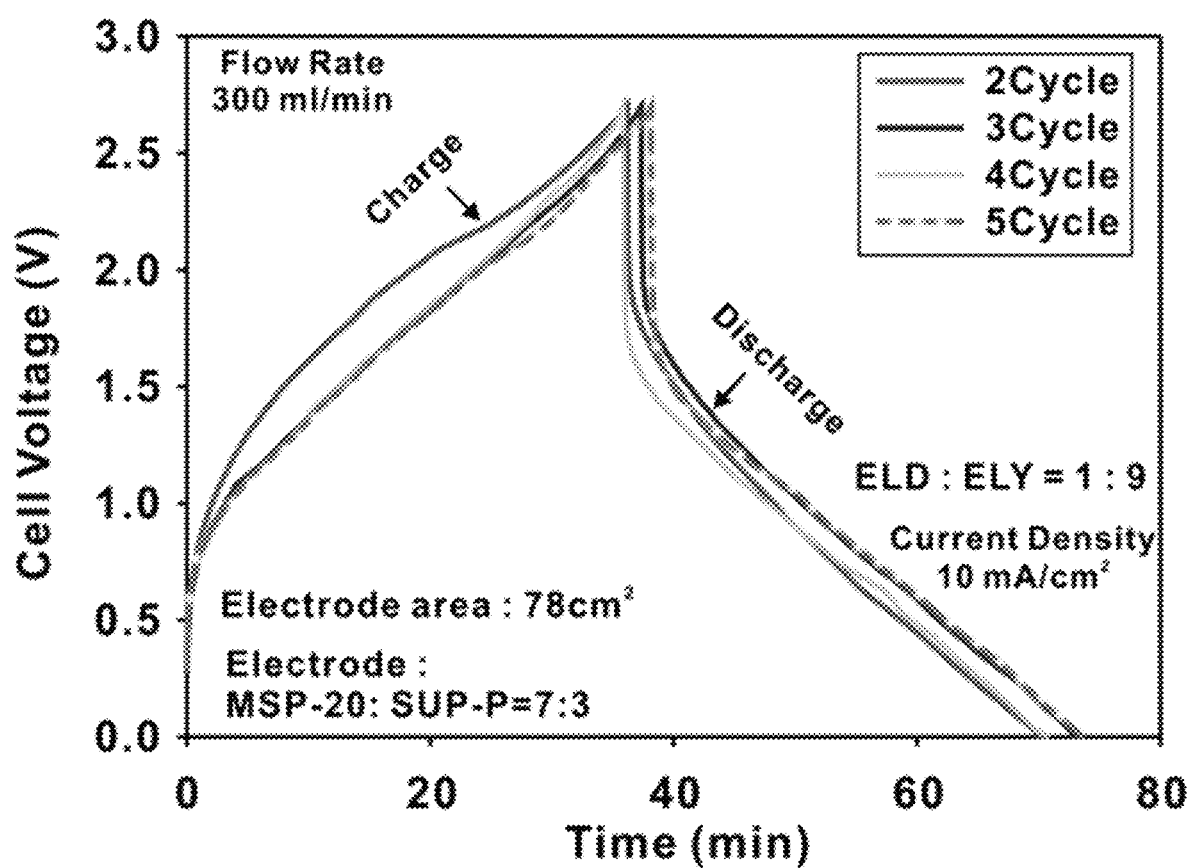
FIG. 7 is a graph showing the result of a charging and discharging experiment using the reaction cell of the present Example.
Figure 8:
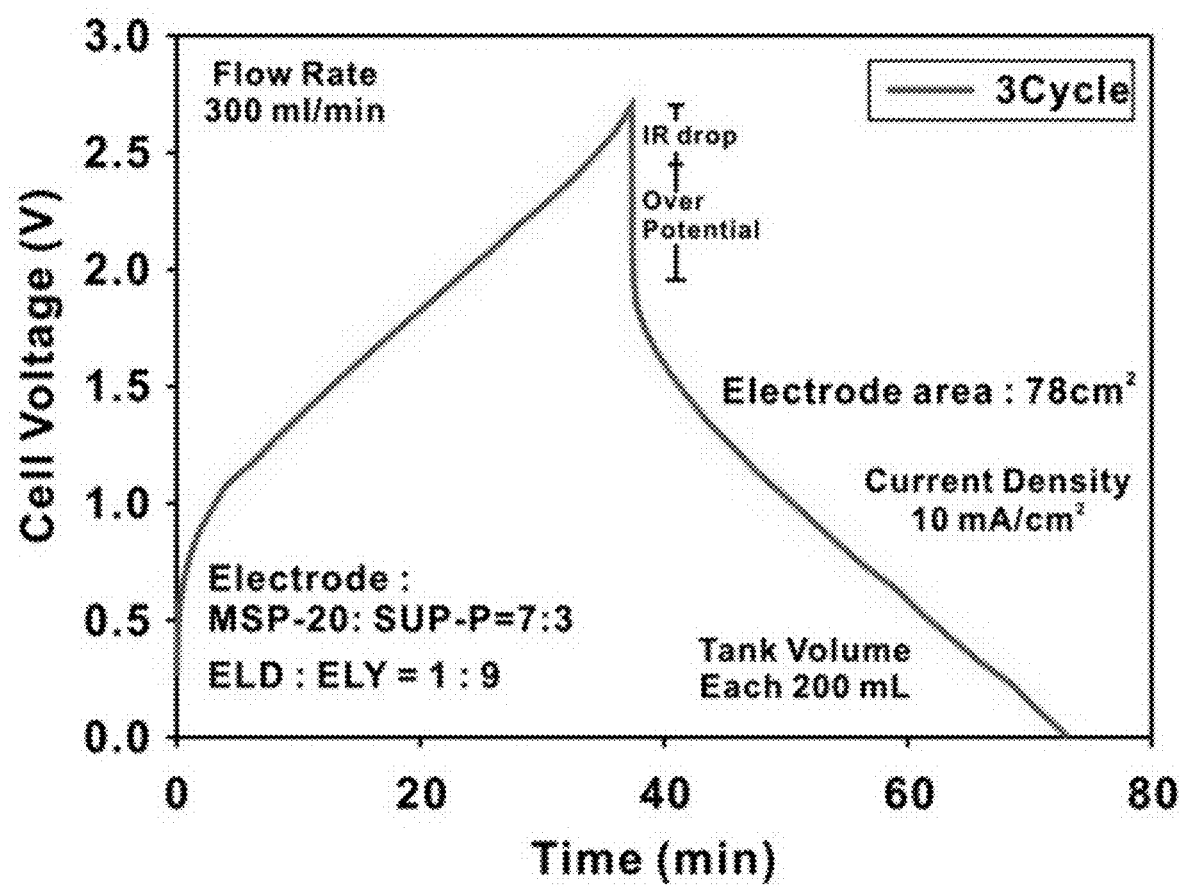
FIG. 8 is a graph separately showing the experimental result of the third cycle of FIG. 7.
Figure 9:
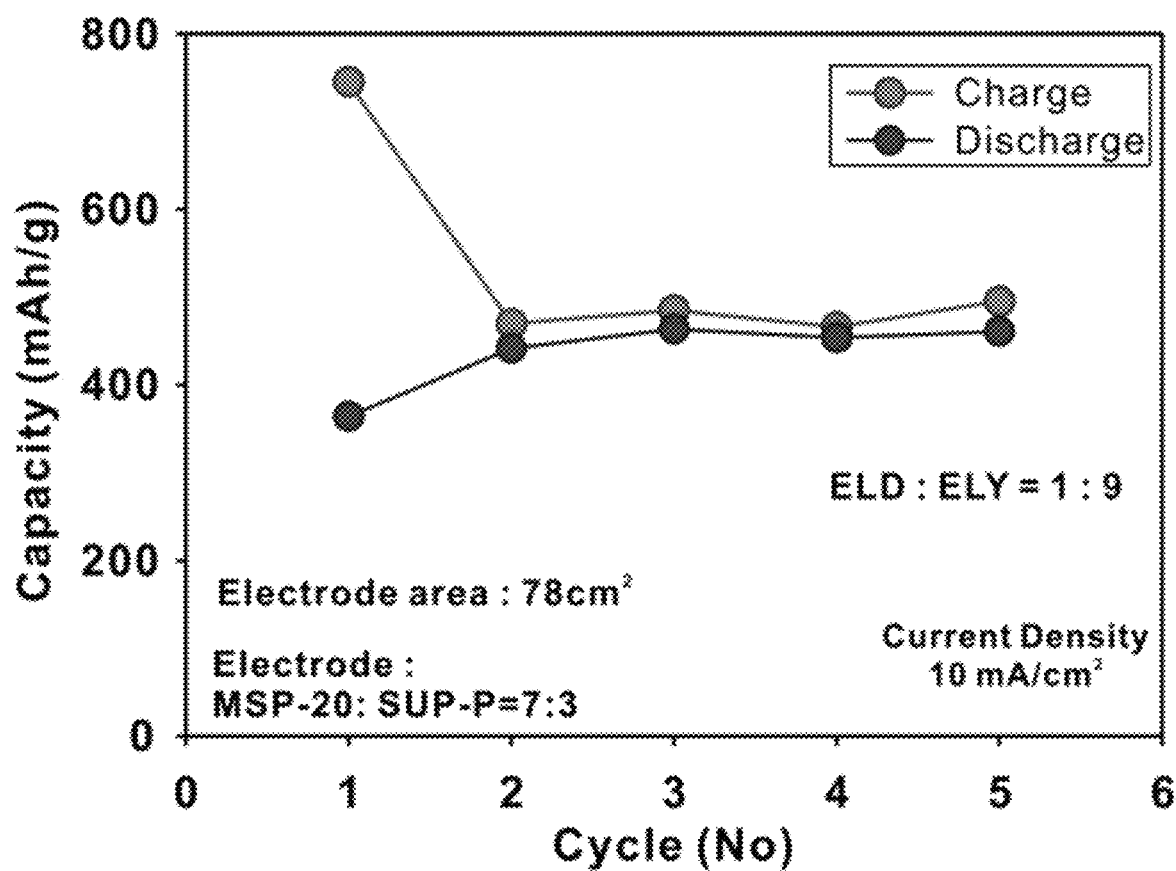
FIG. 9 is a graph showing the change in capacity of the reaction cell of the present Example as a function of a charging and discharging cycle.

FIG. 7 is a graph showing the result of the charging and discharging experiment using the reaction cell of the present Example, and FIG. 8 is a graph separately showing the experimental result of the third cycle. FIG. 9 is a graph showing a change in capacity of the reaction cell of the present. Example as a function of the charging and discharging cycle.

Unlike the result of the reaction cell or the Comparative Example, it can be confirmed that the cycle life and the capacity are not changed and that the IR drop and the over-potential are almost constant even though the charging and discharging cycle repeated when the reaction cell of the present Example is used. This is because the slurry electrode smoothly flows into the reaction region and smoothly flows out from the reaction region, unlike in the Comparative Example.

Therefore, in the present. Example, the shape of the reaction region, into which the fluidic material flows, is changed to induce smooth flow of the fluid, thereby exhibiting stable charging and discharging efficiency even when the charging and discharging cycle is repeatedly performed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A flow-type energy storage device for storing electricity using a fluidic material, the flow-type energy storage device comprising:
   a first electric conductor plate;
   a first gasket including a first reaction region, a first corner, a second corner, a third corner and a fourth corner, the first corner being diagonal to the third corner, and the second corner being diagonal to the fourth corner, the first electric conductor plate facing one side of the first gasket;
   a membrane;
   a second gasket including a second reaction region, a first corner, a second corner, a third corner and a fourth corner, the first corner of the second gasket being diagonal to the third corner of the second gasket, and the second corner of the second gasket being diagonal to the fourth corner of the second gasket; and
   a second electric conductor plate facing one side of the second gasket,
   wherein the membrane is disposed between the first gasket and the second gasket,
   wherein the first to fourth corners of the first gasket correspond to the first to fourth corners of the second gasket, respectively,
   wherein each of the first reaction region and the second reaction region is a reaction region in which charge-discharge reaction of electricity is performed by the fluidic material, and each of the first reaction region and the second reaction region is occupied only by the fluidic material,
   wherein the first reaction region has a first octagonal cross-section including first to eighth sides, and the second reaction region has a second octagonal cross-section including first to eighth sides,
   wherein the first to eighth sides of the first octagonal cross-section correspond to the first to eighth sides of the second octagonal cross-section, respectively,
   wherein the first to fourth corners of the first gasket correspond to the first side, the third side, the fifth side and the seventh side of the first octagonal cross-section, respectively,
   wherein the first to fourth corners of the second gasket correspond to the first side, the third side, the fifth side and the seventh side of the second octagonal cross-section, respectively,
   wherein the first gasket includes an inlet and an outlet at only two corners among the first to fourth corners of the first gasket, and the second gasket includes an inlet and an outlet at only two corners among the first to fourth corners of the second gasket,
   wherein the inlet of the first gasket is disposed at the first corner of the first gasket corresponding to the first side of the first octagonal cross-section and the outlet of the first gasket is disposed at the third corner of the first gasket corresponding to the fifth side of the first octagonal cross-section so that the fluidic material flows diagonally in the first reaction region of the first gasket,
   wherein the inlet of the second gasket is disposed at the fourth corner of the second gasket corresponding to the seventh side of the second octagonal cross-section and the outlet of the second gasket is disposed at the second corner of the second gasket corresponding to the third side of the second octagonal cross-section so that the fluidic material flows diagonally in the second reaction region of the second gasket and diagonal flow directions of the fluidic material in the first reaction region and the second reaction region cross each other, and
   wherein the fluidic material flows in a direction from the first side of the first octagonal cross-section to the fifth side of the first octagonal cross-section in the first reaction region and flows in a direction from the seventh side of the second octagonal cross-section to the third side of the second octagonal cross-section in the second reaction region.

2. The flow-type energy storage device of claim 1, wherein the fluidic material is injected into the first reaction region through the inlet of the first gasket, and the fluidic material is emitted from the first reaction region through the outlet of the first gasket.

3. The flow-type energy storage device of claim 2, wherein the first reaction region includes an anode reaction region, and the second reaction region includes a cathode reaction region while the membrane is positioned between the anode reaction region and the cathode reaction region.

4. The flow-type energy storage device of claim 3, wherein the inlet and the outlet of the first gasket and the inlet and the outlet of the second gasket are disposed so that the fluidic material flows upward in any one reaction region of the anode reaction region and the cathode reaction region and flows downward in the remaining reaction region.

5. The flow-type energy storage device of claim 1, wherein the flow-type energy storage device is a redox flow battery.

6. The flow-type energy storage device of claim 1, wherein the flow-type energy storage device is an electrochemical flow capacitor.

7. A reaction cell for use in a flow-type energy storage device for storing electricity using a fluidic material, the reaction cell comprising:
a first electric conductor plate;
a first gasket including a first reaction region, a first corner, a second corner, a third corner and a fourth corner, the first corner being diagonal to the third corner, and the second corner being diagonal to the fourth corner, the first electric conductor plate facing one side of the first gasket;
a membrane;
a second gasket including a second reaction region, a first corner, a second corner, a third corner and a fourth corner, the first corner of the second gasket being diagonal to the third corner of the second gasket, and the second corner of the second gasket being diagonal to the fourth corner of the second gasket; and
a second electric conductor plate facing one side of the second gasket,
wherein the membrane is disposed between the first gasket and the second gasket,
wherein the first to fourth corners of the first gasket correspond to the first to fourth corners of the second gasket, respectively,
wherein each of the first reaction region and the second reaction region is a reaction region in which charge-discharge reaction of electricity is performed by the fluidic material, and each of the first reaction region and the second reaction region is occupied only by the fluidic material,
wherein the first reaction region has a first octagonal cross-section including first to eighth sides, and the second reaction region has a second octagonal cross-section including first to eighth sides,
wherein the first to eighth sides of the first octagonal cross-section correspond to the first to eighth sides of the second octagonal cross-section, respectively,
wherein the first to fourth corners of the first gasket correspond to the first side, the third side, the fifth side and the seventh side of the first octagonal cross-section, respectively,
wherein the first to fourth corners of the second gasket correspond to the first side, the third side, the fifth side and the seventh side of the second octagonal cross-section, respectively,
wherein the first gasket includes an inlet and an outlet at only two corners among the first to fourth corners of the first gasket, and the second gasket includes an inlet and an outlet at only two corners among the first to fourth corners of the second gasket,
wherein the inlet of the first gasket is disposed at the first corner of the first gasket corresponding to the first side of the first octagonal cross-section and the outlet of the first gasket is disposed at the third corner of the first gasket corresponding to the fifth side of the first octagonal cross-section so that the fluidic material flows diagonally in the first reaction region of the first gasket,
wherein the inlet of the second gasket is disposed at the fourth corner of the second gasket corresponding to the seventh side of the second octagonal cross-section and the outlet of the second gasket is disposed at the second corner of the second gasket corresponding to the third side of the second octagonal cross-section so that the fluidic material flows diagonally in the second reaction region of the second gasket and diagonal flow directions of the fluidic material in the first reaction region and the second reaction region cross each other, and
wherein the fluidic material flows in a direction from the first side of the first octagonal cross-section to the fifth side of the first octagonal cross-section in the first reaction region and flows in a direction from the seventh side of the second octagonal cross-section to the third side of the second octagonal cross-section in the second reaction region.

8. The reaction cell of claim 7, wherein the fluidic material is injected into the first reaction region through the inlet of the first gasket, and the fluidic material is emitted from the first reaction region through the outlet of the second gasket.

9. The reaction cell of claim 8, wherein the first reaction region includes an anode reaction region, and the second reaction region includes a cathode reaction region, while the membrane is positioned between the anode reaction region and the cathode reaction region.

10. The reaction cell of claim 9, wherein the inlet and the outlet of the first gasket and the inlet and the outlet of the second gasket are disposed so that the fluidic material flows upward in any one reaction region of the anode reaction region and the cathode reaction region and flows downward in the remaining reaction region.

11. The reaction cell of claim 7, wherein the flow-type energy storage device is a redox flow battery.

12. The reaction cell of claim 7, wherein the flow-type energy storage device is an electrochemical flow capacitor.

13. The flow-type energy storage device of claim 1, further comprising:
a first current collecting plate having an opening in an octagonal shape, the first electric conductor plate being disposed between the first gasket and the first current collecting plate; and
a second current collecting plate having an opening in an octagonal shape, the second electric conductor plate being disposed between the second gasket and the second current collecting plate,
wherein each of the first electric conductor plate and the second electric conductor plate is formed in an octagonal shape and includes a graphite material.

14. The reaction cell of claim 7, further comprising:
a first current collecting plate having an opening in an octagonal shape, the first electric conductor plate being disposed between the first gasket and the first current collecting plate; and
a second current collecting plate having an opening in an octagonal shape, the second electric conductor plate being disposed between the second gasket and the second current collecting plate,
wherein each of the first electric conductor plate and the second electric conductor plate is formed in an octagonal shape and includes a graphite material.

* * * * *